Aug. 25, 1953
A. FORMANEK
2,650,088
DOUBLE-ACTING SHOCK ABSORBER AND STABILIZER
Filed May 29, 1951
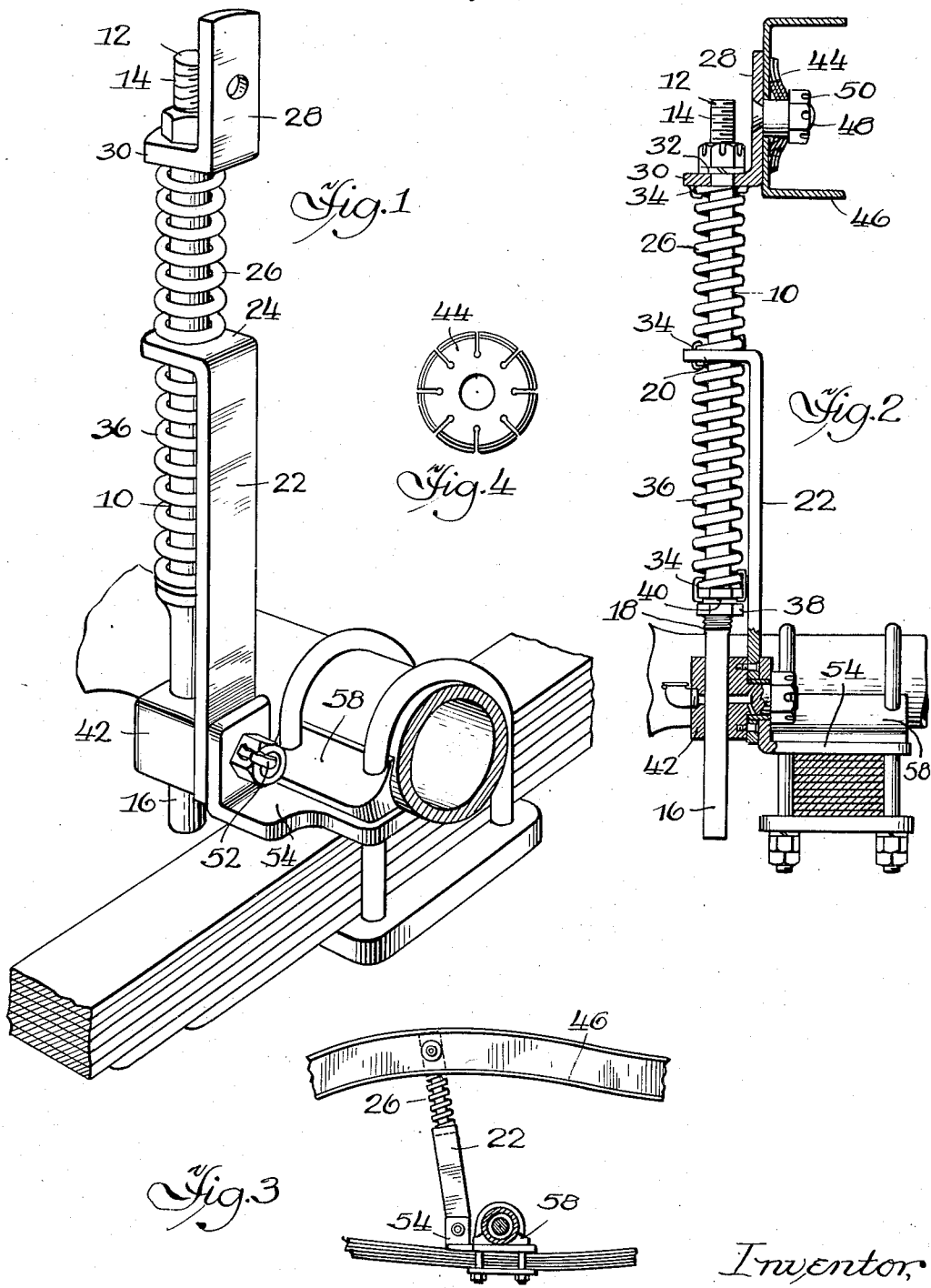
Inventor,
Alois Formanek
By: R. B. Slisz Atty.

Patented Aug. 25, 1953

2,650,088

UNITED STATES PATENT OFFICE 2,650,088

DOUBLE-ACTING SHOCK ABSORBER AND STABILIZER

Alois Formanek, Chicago, Ill.

Application May 29, 1951, Serial No. 228,828

5 Claims. (Cl. 267—28)

1

This invention pertains to a shock absorber resilient means. More particularly it is directed to shock absorber that is double acting and can be used on any type of vehicle.

Shock absorbers as used on vehicles and particularly for automobile use are either spring controlled or fluid controlled. The fluid controlled shocks most frequently use a hydraulic fluid in their operation to obtain a desired cushioning effect and lessening of inconveniences caused by the jars of the wheels and vehicular body over an unevenness in the surface of the thoroughfare. Occasionally, one will also find shock absorbers being operated pneumatically wherein air is suddenly compressed within a retaining cylinder by a piston attached to the wheel support assembly. Regardless of the type of fluid used, these shocks do not always cushion the rebound satisfactorily for there is no cushioning action of equal value in the reverse direction.

For the same reasons shock absorbers employing springs have only a strong cushioning effect principally in one direction. Though springs of the helical type are provided occasionally to have a double acting position, the shocks are so constructed that it is impossible to have proper equilibrium between action.

In order to have proper action, a shock absorber should not only retard any sudden jolt but also to dampen gradually the resulting bounce that the vehicle suffers because of the springy nature of the supporting body coil or leaf springs. In addition to the above shock absorbers, if properly designed, will also act as helper springs and as stabilizers to dampen and eliminate side sway of the body as it hits a bump or as it is made to turn suddenly as around corners, curves, etc.

Though this invention has reference to improvements in shock absorbers for use on automobiles, it can be applied with equal effectiveness to other vehicles, such as wagons, motorcycles, bicycles and even airplane landing gear, for the principles underlying my invention can be adapted by one skilled in this art to many other related fields.

It therefore is an object of my invention to provide an improved type of shock absorbers for vehicular devices.

A further object of my invention is to provide an improved type of a spring shock absorber that is double acting.

A still further object of my invention is to provide an improved double acting spring shock absorber that will prevent side sway and shift of the vehicle body.

2

Another but not final object of my invention, is to provide an extremely simple, inexpensive, straight line construction in an improved type of a spring, double acting shock absorber that has a wide number of applications, including as well automotive vehicles.

These and other objects, adaptations, variations, modifications and extensions will be clearly foreseeable by one skilled in this art after recourse is had to the accompanying description and drawings.

The invention is best understood from a consideration of the following detailed description taken in connection with the accompanying drawings forming a part of this specification, with the further understanding that while the drawings show a practical form of my invention, the latter is not confined to any strict conformity with the showing of the drawings, but may be changed and modified so long as such changes and modifications mark no material departure from the salient features of the invention.

In the drawings certain elements thereof are identified by numerical characters, which are also applied in the same identical meaning and used as such in the description hereinbelow for sake of clarity and ease of understanding the principles underlying this invention.

In the drawings Figure 1 is a perspective view showing the improved shock absorber and stabilizer in position mounted on the axle of the vehicle.

Figure 2 is a side elevational view, showing partly in section the nature of the means of the spring mountings and also the freely floating stabilizer spindle.

Figure 3 shows a view with the shock absorber and stabilizer attached to a partial section of car framing.

Figure 4 is a perspective view of an elastic washer used as a part of frame attachment means.

Essentially, my improved shock absorber and stabilizer comprises a longitudinal rod 10 having on one end 12 thereof (preferably the upper end) threads 14 while the other end terminates into a relatively smooth rod or spindle portion 16. About the inner or upper portion of said spindle end 16 are threads 18.

An L-shaped longitudinal bracket 22 having a right angle web 24 in which is an opening 20 and through which is inserted the rod 10 is provided to act as a spring bearing plate for the helical springs 26 and 36. On top of this web 24 and about the rod 10 is placed a helical spring 26 of appropriate strength and design. The spring 26 is retained in position about the rod 10 by another short L-shaped bracket 28 whose right angle web 30 has an opening 32 through which the rob 10 can protrude. A nut 34 engages the threads 14 and compresses the spring 26 to any desired degree of tension.

The spring 26 is retained in contacting relationship with webs 24 and 30 by means of clips 34, though in some cases it may be desirable to weld the spring member to the webs or use other well known means of fastening the spring 26 to the webs 24 and 30. This is a desirable feature of my invention for I am able to control to a considerable extent the degree of bounce of the vehicular body when the wheels hit rough or uneven pavement.

Another spring 36 is similarly disposed about the longitudinal rod 10 but is placed below the web 24 of the longitudinal bracket 22 and between the said web 24 and a nut 38 which is engaged by threads 18 on the lower portion of the rod 10. Clips 34 can also be provided to hold down the spring 36 or any other means can be used to fasten the spring 36 to the nut 38. However, it is preferred to use a nut whose sides have a slot or groove 40 formed therein in which the clip 34 can be inserted. The grooved nut 38 adjusts the tension on the lower spring 36 as the latter is confined below the web 24.

The lower end or the spindle 16 portion of the rod 10 is slidably engaged by the bearing block 42 and protrudes for a considerable portion below the said block. When the vehicle is jostled up and down the springs 26 and 36 take up whatever additional shock that is caused by the jostling, while the spindle 16 prevents the car from swaying horizontally. The car is not only prevented from sway by the lower end or spindle 16 but also by the longitudinal bracket 22 which engages the rod 10 about its mid-section and further stabilizes the vehicle against side sway. A conventional grease cup or felting provides access for lubricant to the spindle bearing.

However, to avoid snapping of the rod 10 or the bracket 22, I provide series of elastic cup shaped washers 44. The upper part of the smaller bracket 28 is attached to the framing member 46 of the vehicle by means of a stove bolt 48. A number of spring tensioned washers 44 that act as elastic cushions are placed about the bolt 44 and held in place against the framing 46 by means of the nut 50 engaged by the threads on the stove bolt 48. A sudden side sway is cushioned slightly by the elastic washers 44 and prevents the rod 10 or the bracket 22 from snapping or bending.

The lower end of the bracket 22 is provided with a hole through which a stud bolt 52 protrudes and into a shackle bracket plate 54 which is held in place by the spring shackle means 58.

In operation, when the vehicle is bounced upwardly, the bracket 28 pulls on the rod 10, which in turn compresses the spring 36 to act on the web 24 of bracket 22. Likewise, at the same time spring 26 fastened at top and bottom by clips 34 is under elongating tension and therefore has a tendency to pull the vehicular body to itself. Thus a double action is obtained. Similarly if the wheels should hit a bump the bracket 22 will transmit the shock to the spring 26 which now is under compression and it will push upwardly the body and also cause the bracket 28 to pull upwardly on the rod 10. But this upward movement is restrained by the rod 10 and the nut 38 which will force the spring 36 into compression against the bottom of the web 24 of the bracket 22 with the result that the shock is absorbed within the wheels and the mechanism while the car body will only have at best a slight motion.

If desired, the springs 26 and 36 can be set at the shop during assembly for the best riding quality and then the whole assembly mounted on the framing of the vehicle as shown in Figure 3.

It is clearly apparent that my invention can be varied widely, and it is not my intention to be limited by the examples described hereinabove which illustrate only the preferred embodiments and are within the scope of the spirit underlying the principles of my invention as defined in the hereunto appended claims.

I claim:

1. A preset tension shock absorber for vehicles comprising a long rod, an L-shaped bracket, an aperture through the short leg of said L-shaped bracket through which said rod extends, helical springs mounted about said rod, below and above said apertured leg, the lower end of said rod having thereon a spindle, a bearing block slidable engaging said spindle end of said rod, a means mounted on said rod above said spindle to preset the tension of lower helical spring, a means mounted on upper end of said rod to preset the tension of the upper helical spring, a means to mount said upper end of rod to the body of a vehicle, and a means to mount said L-shaped bracket and said bearing block to the wheel support of the vehicle.

2. In the assembly of claim 1, a means to retain said helical springs in contacting juxtaposition with the said short leg and said means to preset tension.

3. In the assembly of claim 1, wherein the short apertured leg of said L-shaped bracket is in slidable engagement with about the middle portion of the shank of said rod.

4. In the assembly of claim 1, wherein the said means to preset tension of the said helical springs comprises a nut and thread arrangement.

5. In the assembly of claim 1, wherein the means to mount the upper end of said rod to the vehicle is a short L-shaped bracket, both legs of said bracket having holes therethrough, one of said holes receiving the upper end of said rod, a means to hold the said rod in juxtaposition with said bracket, and a bolt through said other hole.

ALOIS FORMANEK.

References Cited in the file of this patent

UNITED STATES PATENTS

| Number | Name | Date |
|---|---|---|
| 99,473 | Pratt | Feb. 1, 1870 |
| 1,029,478 | Sturgeon | June 11, 1912 |
| 1,272,497 | Monahan | July 16, 1918 |
| 2,330,102 | Yarnall | Sept. 21, 1943 |